United States Patent
Goenka et al.

(10) Patent No.: US 11,797,517 B2
(45) Date of Patent: Oct. 24, 2023

(54) PUBLIC CONTENT VALIDATION AND PRESENTATION METHOD AND APPARATUS

(71) Applicant: YAHOO ASSETS LLC, New York, NY (US)

(72) Inventors: Mohit Goenka, Santa Clara, CA (US); Saranyaa Parthikumar, Sunnyvale, CA (US)

(73) Assignee: YAHOO ASSETS LLC, New York, NY (US)

( * ) Notice: Subject to any disclaimer, the term of this patent is extended or adjusted under 35 U.S.C. 154(b) by 78 days.

(21) Appl. No.: 17/352,547

(22) Filed: Jun. 21, 2021

(65) Prior Publication Data
US 2022/0405268 A1    Dec. 22, 2022

(51) Int. Cl.
G06F 16/9538    (2019.01)
G06F 40/30      (2020.01)
G06F 16/23      (2019.01)

(52) U.S. Cl.
CPC ...... *G06F 16/2365* (2019.01); *G06F 16/9538* (2019.01); *G06F 40/30* (2020.01)

(58) Field of Classification Search
None
See application file for complete search history.

(56) References Cited

U.S. PATENT DOCUMENTS

| | | | |
|---|---|---|---|
| 2010/0179911 A1* | 7/2010 | Gorina | G06Q 30/0278 705/348 |
| 2012/0246054 A1* | 9/2012 | Sastri | G06Q 50/01 705/37 |
| 2012/0301864 A1* | 11/2012 | Bagchi | G09B 7/02 434/362 |
| 2013/0246168 A1* | 9/2013 | Wickramasuriya | G06Q 30/02 705/14.49 |
| 2016/0005325 A1* | 1/2016 | Bagchi | G09B 7/00 434/362 |
| 2016/0063993 A1* | 3/2016 | Dolan | G06N 20/00 704/254 |
| 2016/0140446 A1* | 5/2016 | Adderly | G06N 5/022 706/51 |
| 2017/0052971 A1* | 2/2017 | Boyer | G06F 16/345 |
| 2021/0303634 A1* | 9/2021 | Choi | G06F 16/90332 |
| 2022/0383345 A1* | 12/2022 | Zeidler | G06Q 30/0203 |

* cited by examiner

*Primary Examiner* — Irene Baker
(74) *Attorney, Agent, or Firm* — James J. DeCarlo; Greenberg Traurig, LLP

(57) ABSTRACT

Techniques for identifying and validating online content items for presentation to users are disclosed. Disclosed systems and methods use a sentiment analyzer to determine a sentiment of a candidate content item and collateral content items identified using keywords associated with the candidate content item, determine a measure of agreement in sentiment using the sentiments determined for the candidate content item and collateral content items, and provide at least a portion of the candidate content item in a display at a client computing device, the display including a consensus belief indicator representing the measure of agreement in sentiment.

20 Claims, 7 Drawing Sheets

FEB 2, 2021 10:27 AM — Gold and silver futures prices are trading sharply lower in midday U.S. trading Tuesday, with silver leading the way. It appears the attempted short-squeeze in the silver market has quickly fizzled. Rallying global equity markets early this week are also a bearish element for the safe-haven metals. April gold futures were last down $26.10 at $1,837.80 and March Comex silver was last down $2,768 at $26.66 an ounce.
Read More

FEB 1, 2021 6:00 PM — Some posts on WallStreetBets late Sunday and Monday suggested their movement is being co-opted by hedge funds and there is no coordinated effort in the silver market.
Read More

FEB 1, 2021 3:00 PM — Last week, investors based on the Reddit group WallStreetsBets drove up the prices of shares in heavily-shorted companies, notably GameStop, forcing hedge funds to cover their shorts by selling big long bets. That, in turn, contributed to a selloff that saw major indexes slide. But the rush isn't over yet. WallStreetBets investors have a new focus: silver
Read More

FEB 1, 2021 10:00 AM — A "short squeeze" on the silver bullion market became the hot topic of discussion on the Reddit site WallStreetBets last week and over the weekend. Stocks related to silver soon saw their value spike for no apparent reason.
Read More

Figure 5

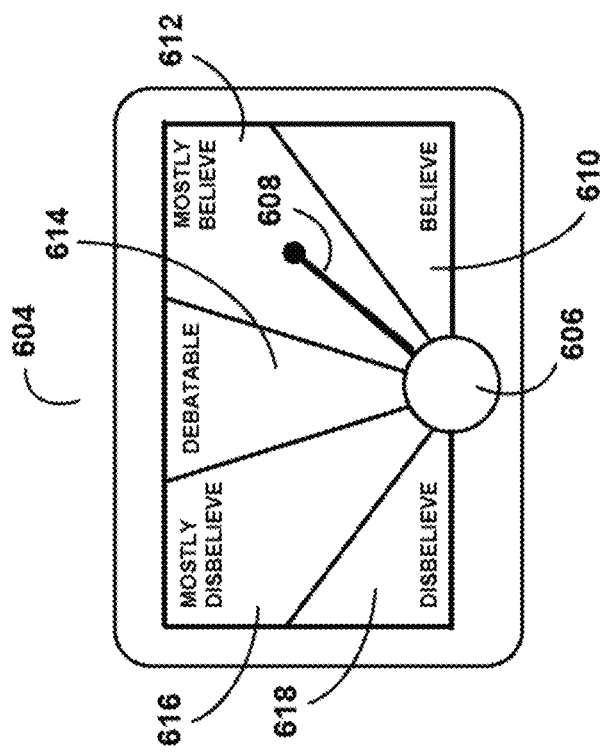
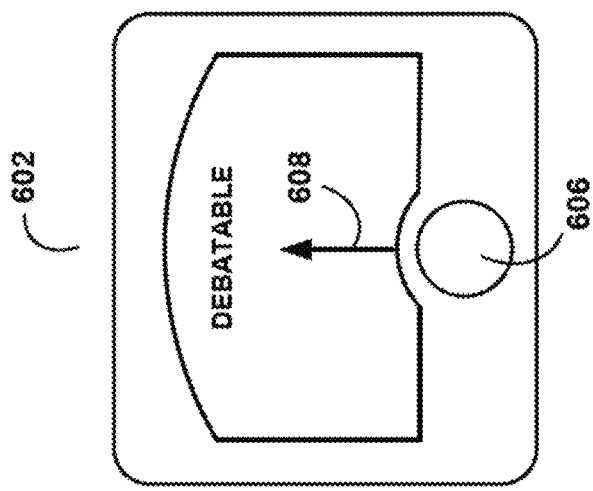
Figure 6

PUBLIC CONTENT VALIDATION AND PRESENTATION METHOD AND APPARATUS

FIELD OF THE DISCLOSURE

The present disclosure relates to improvements to validating and fact checking publicly-shared content, such as and without limitation validating content through data lookup on the internet and then presentation of the data in a timeline format.

BACKGROUND

The internet, or web, has become a prominent vehicle for obtaining information. However, the source of the information available on the web can run the gamut from a well-known and trusted source to an anonymous source. In fact, the source of information can be virtually anyone with a device connected to the web.

Content available at a website that is regularly visited by a user is more likely to be trusted by the user than content at a website that is new or unfamiliar to the user. Typically, a user is likely to have a natural skepticism about the content from a new or unfamiliar site. In some cases, a website that is regularly-visited by a user might aggregate and present content from other websites or online sources. If the user regularly visits the content aggregation website, the user might be inclined to trust the content being presented there even though the content is actually from a website that is new or unfamiliar to the user. This can present a problem if the content being aggregated is not trustworthy.

SUMMARY

The present disclosure provides novel systems and methods for automatically identifying, validating and presenting content items, such as publicly-shared content including content obtained from sources on the internet. Embodiments of the present disclosure select a content item, such news or other informational content, that is likely to be of interest to users (e.g., users of an online content aggregation website provider) and make a determination that there is an acceptable consensus belief in the selected content item prior to presenting the content item to the users. Embodiments of the present disclosure identify related content items, such as in the case of a developing story, and present the related content items as a timeline presentation with an indicator of the determined consensus belief in each item over the time of the story being available or evolving.

Presently, there are two approaches for presenting a developing story. One involves the use of human editors to, in effect, generate a presentation containing information about different milestones of the story in a list format. Another approach involves using keywords to search for content, such as news articles, and then displaying a collection of search results in a page format. The use of human editors is cost prohibitive and time consuming, especially so in the case of a developing story with a number of related content items. In addition, neither approach has an ability to automatically validate the content or to automatically build a timeline presentation of automatically-validated content. As a result, the onus of validating the content generated from these two approaches falls on each user consuming the content.

Thus, there is a need for an automated identification, validation and presentation of content items. Disclosed herein are systems and methods for automatically selecting one or more content items, validating the selected content item(s), and automatically presented the automatically-validated content item(s).

Disclosed systems and methods use a sentiment analyzer to determine a sentiment of a candidate content item and collateral content items identified using keywords associated with the candidate content item, determine a measure of agreement in sentiment using the sentiments determined for the candidate content item and collateral content items, and provide at least a portion of the candidate content item in a display at a client computing device, the display including a consensus belief indicator representing the measure of agreement in sentiment.

In accordance with one or more embodiments, the measure of agreement in sentiment indicating a consensus belief in a selected content item can be determined during the content item's validation. In accordance with one or more embodiments, related content items can be presented in a chronological order in a timeline presentation comprising, for each content item, temporal information, a brief summary of its contents and an indicator of a consensus belief in its contents.

According to some embodiments, the disclosed systems and methods first obtain a number of content items to be considered for presentation to users, e.g., presented via a web browser, client application, etc. By way of a non-limiting examples, a content item can be web content from a number of online sources. By way of a further non-limiting example, the web content can include news, blog posts, newsletter, articles, etc. available from various online websites. The content items can be retrieved using a crawler, search engine, etc. from online websites and/or received from content providers.

The disclosed systems and methods can then make a determination whether a selected content item is a viable candidate for presentation. The determination can be made in response to a content presentation request, such as can be received by a server computer from a web browser (or another client application) executing at a client computing device. In accordance with at least one embodiment, the determination can comprise identifying a number of keywords connected with a candidate content item. By way of some non-limiting examples, a keyword connected with a candidate content item can be extracted from the candidate content item's headline and/or body, from metadata (e.g., hashtag or other metadata) associated with the candidate content item, etc.

A frequency (e.g., a number of occurrences, number of repetitions, etc.) can be determined for each keyword connected with the candidate content item. The frequency associated with each keyword can be used to order the keywords based on frequency and select a number of keywords with greater (or higher) frequency relative to unselected keywords. The number of selected keywords can form a set of keywords that are considered to be the most repeated keywords connected with the candidate content item.

The disclosed systems and methods can then use the set of keywords to search for a corpus of collateral content items. In accordance with one or more embodiments, each collateral content item can include some or all of the keywords in the set of keywords. Some non-limiting examples of sources for the collateral content items include social networking sites (e.g., Facebook®, Instagram®, Twitter®, Reddit®, etc.), content providers (e.g., online news providers), messaging platforms, and websites (e.g., websites operated by a common provider and other websites or online sources). In accordance with some embodiments, multiple, diverse sources of collateral content items can be used by the disclosed systems and methods to provide a proficient content identification and validation mechanism.

The disclosed systems and methods can then use the set of keywords connected with the candidate content item and the corpus of collateral content items to determine if there is a sufficient level of interest in the candidate content item—e.g., if a subject, topic, information, etc. of the candidate content item has a sufficient (e.g., at least a threshold) level of interest with users.

The users, or public, interest in a candidate content item (e.g., a new story or other content item) can be determined using the corpus of collateral content items. In accordance with one or more embodiments, the corpus of collateral content items can be used to determine a frequency for each keyword (in the set of keywords connected with the candidate content item) in the corpus of collateral content items. In a case that the set of keywords comprises multiple keywords, an aggregate keyword frequency (e.g., an average keyword frequency, weighted average keyword frequency, etc.) can be determined. The determined keyword frequency (or frequencies) can be can then be used with a threshold keyword frequency to make a determination whether or not to there is sufficient interest in the contents of the candidate content item. By way of a non-limiting example, a sufficient level of interest in the candidate content item can be determined if the keyword frequency (or frequencies) satisfy (e.g., are at least equal to) the frequency threshold.

The disclosed systems and methods can then validate, or fact check, the candidate content item using some or all of the collateral content items from the corpus of collateral content items and a sentiment analyzer. In accordance with one or more embodiments, the sentiment analyzer can be a natural language processing (NLP) sentiment analyzer. In accordance with one or more embodiments, some or all of the collateral content items from the corpus of collateral content items retrieved using the set of keywords connected with the selected candidate content item can be used with the NLP sentiment analyzer to fact check the candidate content item.

In accordance with one or more embodiments, the NLP sentiment analyzer can be used to identify a sentiment of the candidate content item and a sentiment of each collateral content item of a number of the collateral content items (from the corpus of collateral content items) used to fact check the selected candidate content item. The sentiment analyzer can be used to examine a content item (e.g., a candidate content item or a collateral content item) for an expression of an opinion, appraisal, emotion, attitude, etc. towards a topic, person or entity. An expression can be classified as positive, negative, or neutral in sentiment. A sentiment can also include a tone, such as a sad, happy, etc. tone.

By way of a non-limiting example, the collateral content items retrieved from one or more social networking platforms using the set of keywords connected with the selected candidate content item can be used with natural language processing (NLP) to fact check the selected candidate content item. By way of a further non-limiting example, collateral content items retrieved from one or more messaging platforms and/or websites can be used along with the collateral content items retrieved from one or more social networking platforms in fact checking the selected candidate content item.

The disclosed systems and methods can then generate a measure of agreement in sentiment using sentiment scores (e.g., from the sentiment analyzer) associated with the collateral content items (from the corpus used in fact checking the selected candidate content item). The disclosed systems and methods can then make a determination whether or not there is a consensus belief in the information contained in the selected candidate content item using a sentiment agreement threshold (or consensus belief threshold) and the measure of agreement in sentiment generated for the candidate content item. In accordance with one or more embodiments, the determination can be a condition of providing the candidate content item in a presentation to a user. If the measure of agreement in sentiment satisfies the sentiment agreement threshold (e.g., the measure of agreement in sentiment is at least equal to the sentiment agreement threshold), a determination is made that there is an acceptable consensus belief in the information conveyed in the candidate content item. The sentiment agreement threshold (or consensus belief threshold) can be determined from a user preference.

In accordance with one or more embodiments, the disclosed systems and methods can then use portions (e.g., paragraphs, sections, subsections, etc.) of the selected candidate content item (determined to have an acceptable consensus belief) to identify a set of content items, other than the identified candidate content, each with a sentiment determined to match the selected candidate content item's sentiment. In this manner, each content item being considered for inclusion in the set of content items can be fact checked using portions of the selected candidate content item that has itself been fact checked. By way of a non-limiting example, the set of content items can be selected from the corpus of collateral content items retrieved using the set of keywords connected with the selected candidate content item, such as and without limitation collateral content items retrieved from online sources using the set of keywords connected with the selected candidate content item.

By way of a non-limiting example, one or more other content items can be selected for inclusion in the set of content items using a portion of the selected candidate content item. In accordance with one or more embodiments, for each portion of the selected candidate content item being used to identify the set of content items with matching sentiments, a sentiment can be determined using NLP and collateral content items from the corpus (e.g., collateral content items used in fact checking the selected candidate content item). A sentiment can also be determined for each content item being considered for inclusion in the set of content items. The one or more content items selected for inclusion in the set of content items can be the content item(s) having a sentiment that matches the sentiment of a portion of the candidate content item.

The disclosed systems and methods can then generate a presentation using the selected and fact-checked candidate content item and each content item in the set of content items. In accordance with one or more embodiments, the presentation can be a timeline presentation including the candidate content items and the set of content items. In accordance with one or more embodiments, each content item in the timeline presentation can have corresponding temporal information (e.g., a time and date of the posting of the content item on the web), which can be used in ordering the content items in the timeline presentation.

In accordance with one or more embodiments, the timeline can comprise, for each content item included in the timeline, temporal information, a brief summary of the content item and an indicator of the consensus belief in the content item. By way of a non-limiting example, the indicator can be a gauge (or meter) comprising a range of consensus beliefs and an arrow positioned within the range and indicating the determined consensus belief for a respective content item being presented in the timeline. In accordance with one or more embodiments, the timeline can comprise an indicator (e.g., a dot) associated with each content item indicating whether or not the user has read the content item. By way of a non-limiting example, the indicator can comprise a dot with one color (e.g., blue) indicating that the user has not yet read the content item and another color (e.g., black) otherwise.

In accordance with one or more embodiments, the presentation can include an indicator of an overall (e.g., aggregate) consensus belief in the content presented in the timeline. By way of a non-limiting example, an aggregate consensus belief can be an average consensus belief determined using the measure of agreement in sentiment determined for each of the content items included in the timeline. In one or more embodiments, a weighting can be used in determining the aggregate measure of agreement in sentiment. By way of a non-limiting example, the measure of agreement in sentiment determined for the identified candidate content item can be given a greater weight than the measure of agreement in sentiment determined for other content items in determining the aggregate consensus belief.

It will be recognized from the disclosure herein that embodiments of the instant disclosure provide improvements to a number of technology areas, for example those related to systems and processes that provide content, e.g., online content, to users. By way of some non-limiting examples, systems and processors can use sentiments determined using a sentiment analyzer (e.g., an NLP sentiment analyzer) and related content items to identify and fact check content items found on the web prior to presenting the content items to users, such that content items having an acceptable consensus belief are presented and other content items lacking an acceptable consensus belief can be ignored. The disclosed systems and methods can improve the quality of content presentations and effectuate increased speed and efficiency in the ways that content items are presented to online users, as the disclosed systems and methods, inter alia, automatically identify and fact check content items using other content items and sentiments determined using a sentiment analyzer (e.g., an NLP sentiment analyzer).

In accordance with one or more embodiments, a method is disclosed which includes receiving, at a computing device, a content presentation request from a client computing device; selecting, via the computing device, a candidate content item in connection with the content presentation request; identifying, via the computing device, a corpus of collateral content items; determining, via the computing device and using a sentiment analyzer, a sentiment for the selected candidate content item and a sentiment for each of a number of collateral content items from the corpus of collateral content items; determining, via the computing device, a measure of agreement in sentiment using the sentiments determined for the selected candidate content item and the number of collateral content items; and providing, via the computing device, at least a portion of the content item to the client computing device for display in response to the content presentation request, the display comprising a consensus belief indicator representing the measure of agreement.

In accordance with one or more embodiments, a non-transitory computer-readable storage medium is provided, the non-transitory computer-readable storage medium tangibly storing thereon, or having tangibly encoded thereon, computer readable instructions that when executed cause at least one processor to perform a method for automatic content item identification, validation and presentation using sentiment matching and natural language processing (NLP).

In accordance with one or more embodiments, a system is provided that comprises one or more computing devices configured to provide functionality in accordance with such embodiments. In accordance with one or more embodiments, functionality is embodied in steps of a method performed by at least one computing device. In accordance with one or more embodiments, program code (or program logic) executed by a processor(s) of a computing device to implement functionality in accordance with one or more such embodiments is embodied in, by and/or on a non-transitory computer-readable medium.

DRAWINGS

The above-mentioned features and objects of the present disclosure will become more apparent with reference to the following description taken in conjunction with the accompanying drawings wherein like reference numerals denote like elements and in which.

Figure 7:
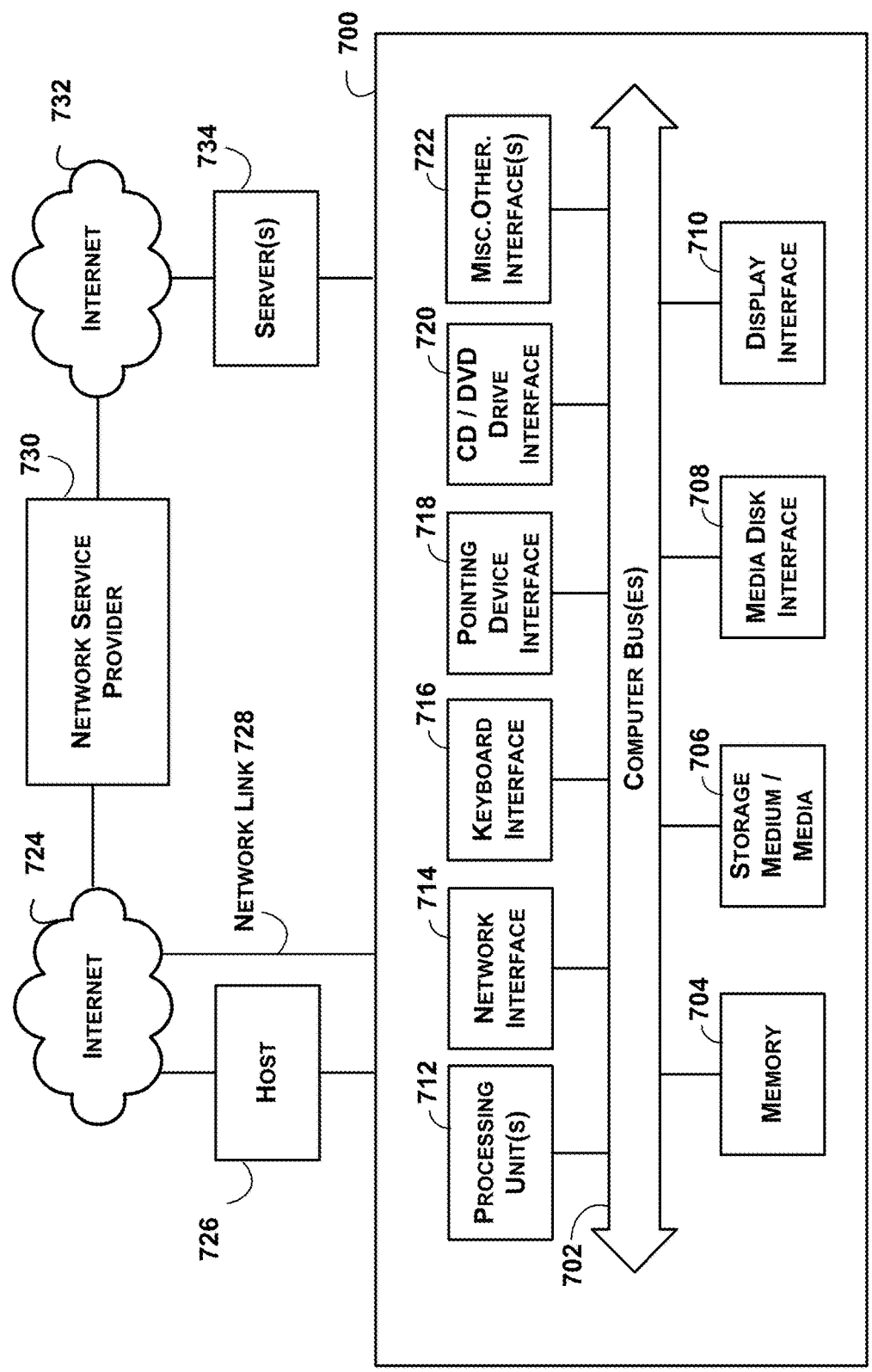

FIG. 5 provides an exemplary example of a timeline presentation in accordance with one or more embodiments of the present disclosure;

FIG. 6 is a diagram of an exemplary example of a non-limiting embodiment in accordance with some embodiments of the present disclosure; and FIG. 7 is a block diagram illustrating the architecture of an exemplary hardware device in accordance with one or more embodiments of the present disclosure.

DETAILED DESCRIPTION

Subject matter will now be described more fully hereinafter with reference to the accompanying drawings, which form a part hereof, and which show, by way of illustration, specific example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

The present disclosure is described below with reference to block diagrams and operational illustrations of methods and devices. It is understood that each block of the block diagrams or operational illustrations, and combinations of blocks in the block diagrams or operational illustrations, can be implemented by means of analog or digital hardware and computer program instructions. These computer program instructions can be provided to a processor of a general purpose computer to alter its function as detailed herein, a special purpose computer, ASIC, or other programmable data processing apparatus, such that the instructions, which execute via the processor of the computer or other programmable data processing apparatus, implement the functions/acts specified in the block diagrams or operational block or blocks. In some alternate implementations, the functions/acts noted in the blocks can occur out of the order noted in the operational illustrations. For example, two blocks shown in succession can in fact be executed substantially concurrently or the blocks can sometimes be executed in the reverse order, depending upon the functionality/acts involved.

These computer program instructions can be provided to a processor of: a general purpose computer to alter its function to a special purpose; a special purpose computer; ASIC; or other programmable digital data processing apparatus, such that the instructions, which execute via the processor of the computer or other programmable data processing apparatus, implement the functions/acts specified in the block diagrams or operational block or blocks, thereby transforming their functionality in accordance with embodiments herein.

For the purposes of this disclosure a computer readable medium (or computer-readable storage medium/media) stores computer data, which data can include computer program code (or computer-executable instructions) that is executable by a computer, in machine readable form. By way of example, and not limitation, a computer readable medium may comprise computer readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable and non-removable media implemented in any method or technology for the tangible storage of information such as computer-readable instructions, data structures, program modules or other data. Computer readable storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other physical or material medium which can be used to tangibly store the desired information or data or instructions and which can be accessed by a computer or processor.

For the purposes of this disclosure the term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and application software that support the services provided by the server. Servers may vary widely in configuration or capabilities, but generally a server may include one or more central processing units and memory, one or more mass storage devices, or one or more operating systems.

For the purposes of this disclosure a "network" should be understood to refer to a network that may couple devices so that communications may be exchanged, such as between a server and a client device or other types of devices, including between wireless devices coupled via a wireless network, for example. A network may also include mass storage, such as network attached storage (NAS), a storage area network (SAN), or other forms of computer or machine readable media, for example. A network may include the Internet, one or more local area networks (LANs), one or more wide area networks (WANs), wire-line type connections, wireless type connections, cellular or any combination thereof. Likewise, sub-networks, which may employ differing architectures or may be compliant or compatible with differing protocols, may interoperate within a larger network.

A communication link or channel may include, for example, analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links or channels, such as may be known to those skilled in the art.

For purposes of this disclosure, a "wireless network" should be understood to couple client devices with a network. A wireless network may employ stand-alone ad-hoc networks, mesh networks, Wireless LAN (WLAN) networks, cellular networks, or the like. A wireless network may further include a system of terminals, gateways, routers, or the like coupled by wireless radio links, or the like, which may move freely, randomly or organize themselves arbitrarily, such that network topology may change, at times even rapidly.

A wireless network may further employ a plurality of network access technologies, including Wi-Fi, Long Term Evolution (LTE), WLAN, Wireless Router (WR) mesh, or 2nd, 3rd, $4^{th}$, or 5th generation (2G, 3G, 4G or 5G) cellular technology, or the like.

For example, a network may enable RF or wireless type communication via one or more network access technologies, such as Global System for Mobile communication (GSM), Universal Mobile Telecommunications System (UMTS), General Packet Radio Services (GPRS), Enhanced Data GSM Environment (EDGE), 3GPP Long Term Evolution (LTE), LTE Advanced, Wideband Code Division Multiple Access (WCDMA), Bluetooth, 802.11b/g/n, or the like. A wireless network may include virtually any type of wireless communication mechanism by which signals may be communicated between devices.

A computing device may be capable of sending or receiving signals, such as via a wired or wireless network, or may be capable of processing or storing signals, such as in memory as physical memory states, and may, therefore, operate as a server. Thus, devices capable of operating as a server may include, as examples, dedicated rack-mounted servers, desktop computers, laptop computers, set top boxes, integrated devices combining various features, such as two or more features of the foregoing devices, or the like.

For purposes of this disclosure, a client (or consumer or user) device may include a computing device capable of sending or receiving signals, such as via a wired or a wireless network. A client device may, for example, include a desktop computer or a portable device, such as a cellular telephone, a smart phone, a display pager, a radio frequency (RF) device, an infrared (IR) device an Near Field Communication (NFC) device, a Personal Digital Assistant (PDA), a handheld computer, a tablet computer, a phablet, a laptop computer, a set top box, a wearable computer, smart watch, an integrated or distributed device combining various features, such as features of the forgoing devices, or the like.

A client device may vary in terms of capabilities or features. Claimed subject matter is intended to cover a wide range of potential variations. For example, a smart phone, phablet or tablet may be a web-enabled client device including a high resolution screen, one or more physical or virtual keyboards, mass storage, one or more accelerometers, one or more gyroscopes, global positioning system (GPS) or other location-identifying type capability, or a display with a high degree of functionality, such as a touch-sensitive color 2D or 3D display, for example.

A client device may include or may execute a variety of operating systems, including a personal computer operating system, such as a Windows, iOS or Linux, or a mobile operating system, such as iOS, Android, or the like.

A client device may include or may execute a variety of possible applications, such as a client software application enabling communication with other devices, such as communicating one or more messages, such as via email, for example. A client device may also include or execute an application to communicate content, such as, for example, textual content, multimedia content, or the like. A client device may also include or execute an application to perform a variety of possible tasks, such as browsing, searching, playing or displaying various forms of content, including locally stored or streamed video, or games (such as fantasy sports leagues).

The detailed description provided herein is not intended as an extensive or detailed discussion of known concepts, and as such, details that are known generally to those of ordinary skill in the relevant art may have been omitted or may be handled in summary fashion.

The principles described herein may be embodied in many different forms. By way of background, content available at a website that is regularly visited by a user is more likely to be trusted by the user than content at a website that is new or unfamiliar to the user. Typically, a user is likely to have a natural skepticism about the content from a new or unfamiliar site. In some cases, a website that is regularly-visited by a user might aggregate and present content from other websites or online sources. If the user regularly visits the content aggregation website, the user might be inclined to trust the content being presented there even though the content is actually from a website that is new or unfamiliar to the user. This can present a problem if the content being aggregated is not trustworthy.

Presently, there are two approaches for presenting a developing story. One involves the use of human editors to in effect generate a presentation containing information about different milestones of the story in a list format. Another approach involves using keywords to search for content, such as news articles, and then displaying a collection of search results in a page format. The use of human editors is cost prohibitive and time consuming, especially so in the case of a developing story with a number of related content items. In addition, neither approach has an ability to automatically validate the content or to automatically build a timeline presentation of automatically-validated content. As a result, the onus to validate the content generated from these two approaches fall on each user consuming the content.

Thus, there is a need for an automated identification, validation and presentation of content items. Disclosed herein are systems and methods for automatically selecting one or more content items, validating the selected content item(s), and automatically presented the automatically-validated content item(s).

Disclosed systems and methods use a sentiment analyzer to determine a sentiment of a candidate content item and collateral content items identified using keywords associated with the candidate content item, determine a measure of agreement in sentiment using the sentiments determined for the candidate content item and collateral content items, and provide at least a portion of the candidate content item in a display at a client computing device, the display including a consensus belief indicator representing the measure of agreement in sentiment.

In accordance with one or more embodiments, the measure of agreement in sentiment indicating a consensus belief in a selected content item can be determined during the content item's validation. In accordance with one or more embodiments, related content items can be presented in a chronological order in a timeline presentation comprising, for each content item, temporal information, a brief summary of its contents and an indicator of a consensus belief in its contents.

According to some embodiments, the disclosed systems and methods first obtain a number of content items to be considered for presentation to users, e.g., presented via a web browser, client application, etc.

The disclosed systems and methods can then make a determination whether a selected content item is a viable candidate for presentation. The determination can be made in response to a content presentation request, such as can be received by a server computer from a web browser (or another client application) executing at a client computing device. In accordance with at least one embodiment, the determination can comprise identifying a number of keywords connected with a candidate content item. Some or all of the number of keywords can be used to form a set of keywords for the candidate content item.

The disclosed systems and methods can then use the set of keywords to search for a corpus of collateral content items. In accordance with one or more embodiments, each collateral content item including some or all of the keywords in the set of keywords. Some non-limiting examples of sources for the collateral content items include social networking platforms (e.g., Facebook®, Instagram®, Twitter®, Reddit®, etc.), content providers (e.g., online news providers), messaging platforms, and websites (e.g., websites operated by a common provider and other websites or online sources). In accordance with some embodiments, multiple, diverse sources of collateral content items can be used by the disclosed systems and methods to provide a proficient content identification and validation mechanism.

The disclosed systems and methods can then use the set of keywords to determine if there is a sufficient level of interest in the candidate content item—e.g., if a subject, topic, information, etc. of the candidate content item has a sufficient (e.g., at least a threshold) level of interest with users.

The users, or public, interest in a candidate content item (e.g., a new story or other content item) can be determined using the corpus of collateral content items. In accordance with one or more embodiments, the corpus of collateral content items can be used to determine a frequency for each keyword (in the set of keywords connected with the candidate content item) in the corpus of collateral content items. In a case that the set of keywords comprises multiple keywords, an aggregate keyword frequency (e.g., an average keyword frequency, weighted average keyword frequency, etc.) can be determined. The determined keyword frequency (or frequencies) can be can then be used with a threshold keyword frequency to make a determination whether or not to there is sufficient interest in the contents of the candidate content item. By way of a non-limiting example, a sufficient level of interest in the candidate content item can be determined if the keyword frequency (or frequencies) satisfy (e.g., are at least equal to) the frequency threshold.

The disclosed systems and methods can then validate, or fact check, the candidate content item using some or all of the collateral content items from the corpus of collateral content items and a sentiment analyzer. In accordance with one or more embodiments, the sentiment analyzer can be a natural language processing (NLP) sentiment analyzer. In accordance with one or more embodiments, some or all of the collateral content items from the corpus of collateral content items retrieved using the set of keywords connected with the selected candidate content item can be used with the NLP sentiment analyzer to fact check the candidate content item.

In accordance with one or more embodiments, the NLP sentiment analyzer can be used to identify a sentiment of the candidate content item and a sentiment of each collateral content item of a number of the collateral content items (from the corpus of collateral content items) used to fact check the selected candidate content item.

By way of a non-limiting example, the collateral content items retrieved from one or more social networking platforms using the set of keywords connected with the selected candidate content item can be used with natural language processing (NLP) to fact check the selected candidate content item. By way of a further non-limiting example, collateral content items retrieved from one or more messaging platforms and/or websites can be used along with the collateral content items retrieved from one or more social networking platforms in fact checking the selected candidate content item.

The disclosed systems and methods can then generate a measure of agreement in sentiment using sentiment scores (e.g., from the sentiment analyzer) associated with the collateral content items (from the corpus used in fact checking the selected candidate content item). The disclosed systems and methods can then make a determination whether or not there is a consensus belief in the information contained in the selected candidate content item using a sentiment agreement threshold (or consensus belief threshold) and the measure of agreement in sentiment generated for the candidate content item. In accordance with one or more embodiments, the determination can be a condition of providing the candidate content item in a presentation to a user. If the measure of agreement in sentiment satisfies the sentiment agreement threshold (e.g., the measure of agreement in sentiment is at least equal to the sentiment agreement threshold), a determination is made that there is an acceptable consensus belief in the information conveyed in the candidate content item. The sentiment agreement threshold (or consensus belief threshold) can be determined from a user preference.

In accordance with one or more embodiments, the disclosed systems and methods can then use portions (e.g., paragraphs, sections, subsections, etc.) of the selected candidate content item (determined to have an acceptable consensus belief) to identify a set of content items, other than the identified candidate content, each with a sentiment determined to match the selected candidate content item's sentiment. In this manner, each content item being considered for inclusion in the set of content items can be fact checked using portions of the selected candidate content item that has itself been fact checked. By way of a non-limiting example, the set of content items can be selected from the corpus of collateral content items retrieved using the set of keywords connected with the selected candidate content item, such as and without limitation collateral content items retrieved from online sources using the set of keywords connected with the candidate content item.

The disclosed systems and methods can then generate a presentation using the selected and fact-checked candidate content item and each content item in the set of content items. In accordance with one or more embodiments, the presentation can be a timeline presentation including the candidate content items and the set of content items. In accordance with one or more embodiments, each content item in the timeline presentation can have corresponding temporal information (e.g., a time and date of the posting of the content item on the web), which can be used in ordering the content items in the timeline presentation.

In accordance with one or more embodiments, the timeline can comprise, for each content item included in the timeline, temporal information, a brief summary of the content item and an indicator of the consensus belief in the content item. By way of a non-limiting example, the indicator can be a gauge (or meter) comprising a range of consensus beliefs and an arrow positioned within the range and indicating the determined consensus belief for a respective content item being presented in the timeline. In accordance with one or more embodiments, the timeline can comprise an indicator (e.g., a dot) associated with each content item and indicating whether or not the user has read the associated content item. By way of a non-limiting example, the indicator can comprise a dot with one color (e.g., blue) indicating that the user has not yet read the content item and another color (e.g., black) otherwise.

In accordance with one or more embodiments, the presentation can include an indicator of an overall (e.g., aggregate) consensus belief in the story presented by the combination of content items presented in the timeline. By way of a non-limiting example, an aggregate consensus belief can be an average consensus belief determined using the measure of agreement in sentiment determined for each of the content items included in the timeline. In one or more embodiments, a weighting can be used in determining the aggregate measure of agreement in sentiment. By way of a non-limiting example, the measure of agreement in sentiment determined for the identified candidate content item can be given a greater weight than the measure of agreement in sentiment determined for other content items in determining the aggregate consensus belief.

It will be recognized from the disclosure herein that embodiments of the instant disclosure provide improvements to a number of technology areas, for example those related to systems and processes that provide content, e.g., online content, to users. By way of some non-limiting examples, systems and processors can use sentiments determined using a sentiment analyzer (e.g., an NLP sentiment analyzer) and related content items to identify and fact check content items found on the web prior to presenting the content items to users, such that content items having an acceptable consensus belief are presented and other content items lacking an acceptable consensus belief can be ignored. The disclosed systems and methods can improve the quality of content presentations and effectuate increased speed and efficiency in the ways that content items are presented to online users, as the disclosed systems and methods, inter alia, automatically identify and fact check content items using other content items and sentiments determined using a sentiment analyzer (e.g., an NLP sentiment analyzer).

Figure 1:
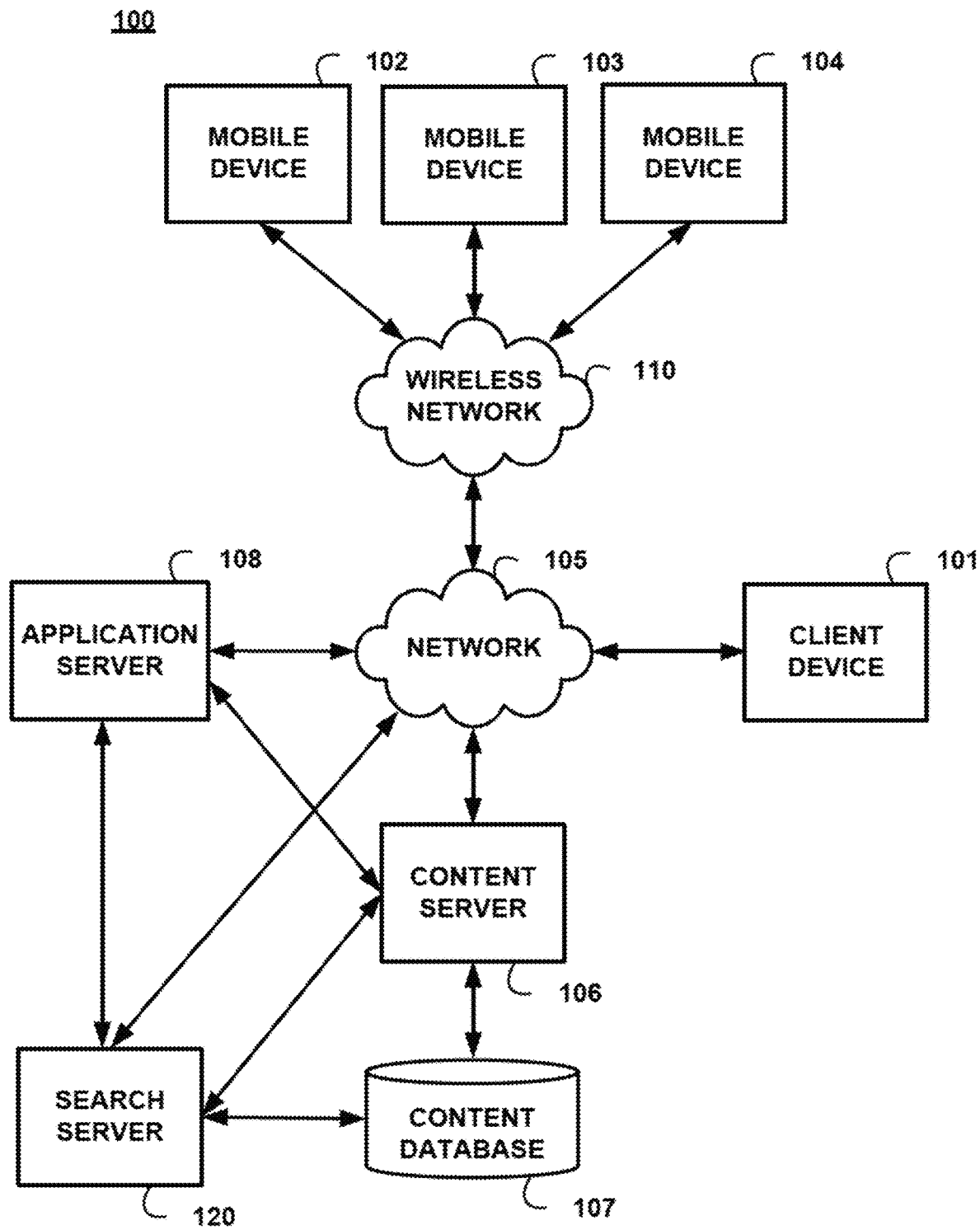
FIG. 1 is a schematic diagram illustrating an example of a network within which the systems and methods disclosed herein could be implemented according to some embodiments of the present disclosure.

Certain embodiments will now be described in greater detail with reference to the figures. The following describes components of a general architecture used within the disclosed system and methods, the operation of which with respect to the disclosed system and methods being described herein. In general, with reference to FIG. 1, a system 100 in accordance with an embodiment of the present disclosure is shown. FIG. 1 shows components of a general environment in which the systems and methods discussed herein may be practiced. Not all the components may be required to practice the disclosure, and variations in the arrangement and type of the components may be made without departing from the spirit or scope of the disclosure. As shown, system 100 of FIG. 1 includes local area networks ("LANs")/wide area networks ("WANs")—network 105, wireless network 110, mobile devices (client devices) 102-104 and client device 101. FIG. 1 additionally includes a variety of servers, such as, by way of non-limiting examples, content server 106, application (or "App") server 108, search server 120 and advertising ("ad") server (not shown).

One embodiment of mobile devices 102-104 is described in more detail below. Generally, however, mobile devices 102-104 may include virtually any portable computing device capable of receiving and sending a message over a network, such as network 105, wireless network 110, or the like. Mobile devices 102-104 may also be described generally as client devices that are configured to be portable. Thus, mobile devices 102-104 may include virtually any portable computing device capable of connecting to another computing device and receiving information. Such devices include multi-touch and portable devices such as, cellular telephones, smart phones, display pagers, radio frequency (RF) devices, infrared (IR) devices, Personal Digital Assistants (PDAs), handheld computers, laptop computers, wearable computers, smart watch, tablet computers, phablets, integrated devices combining one or more of the preceding devices, and the like.

A web-enabled mobile device may include a browser application that is configured to receive and to send web pages, web-based messages, and the like. The browser application may be configured to receive and display graphics, text, multimedia, and the like, employing virtually any web based language, including a wireless application protocol messages (WAP), and the like. In one embodiment, the browser application is enabled to employ Handheld Device Markup Language (HDML), Wireless Markup Language (WML), WMLScript, JavaScript, Standard Generalized Markup Language (SMGL), HyperText Markup Language (HTML), eXtensible Markup Language (XML), and the like, to display and send a message.

Mobile devices 102-104 also may include at least one client application that is configured to receive content from another computing device. The client application may include a capability to provide and receive textual content, graphical content, audio content, and the like. The client application may further provide information that identifies itself, including a type, capability, name, and the like. In one embodiment, mobile devices 102-104 may uniquely identify themselves through any of a variety of mechanisms, including a phone number, Mobile Identification Number (MIN), an electronic serial number (ESN), or other mobile device identifier.

In some embodiments, mobile devices 102-104 may also communicate with non-mobile client devices, such as client device 101, or the like. In one embodiment, such communications may include sending and/or receiving messages, searching for, viewing and/or sharing photographs, audio clips, video clips, or any of a variety of other forms of communications. Client device 101 may include virtually any computing device capable of communicating over a network to send and receive information. The set of such devices may include devices that typically connect using a wired or wireless communications medium such as personal computers, multiprocessor systems, microprocessor-based or programmable consumer electronics, network PCs, or the like. Thus, client device 101 may also have differing capabilities for displaying navigable views of information.

Client devices 101-104 computing device may be capable of sending or receiving signals, such as via a wired or wireless network, or may be capable of processing or storing signals, such as in memory as physical memory states, and may, therefore, operate as a server. Thus, devices capable of operating as a server may include, as examples, dedicated rack-mounted servers, desktop computers, laptop computers, set top boxes, integrated devices combining various features, such as two or more features of the foregoing devices, or the like.

Wireless network 110 is configured to couple mobile devices 102-104 and its components with network 105. Wireless network 110 may include any of a variety of wireless sub-networks that may further overlay stand-alone ad-hoc networks, and the like, to provide an infrastructure-oriented connection for mobile devices 102-104. Such sub-networks may include mesh networks, Wireless LAN (WLAN) networks, cellular networks, and the like.

Network 105 is configured to couple content server 106, application server 108, or the like, with other computing devices, including, client device 101, and through wireless network 110 to mobile devices 102-104. Network 105 is enabled to employ any form of computer readable media for communicating information from one electronic device to another. Also, network 105 can include the Internet in addition to local area networks (LANs), wide area networks (WANs), direct connections, such as through a universal serial bus (USB) port, other forms of computer-readable media, or any combination thereof.

Within the communications networks utilized or understood to be applicable to the present disclosure, such networks will employ various protocols that are used for communication over the network. Signaling formats or protocols employed may include, for example, TCP/IP, UDP, QUIC (Quick UDP Internet Connection), DECnet, NetBEUI, IPX, APPLETALK™, or the like. Versions of the Internet Protocol (IP) may include IPv4 or IPv6. The Internet refers to a decentralized global network of networks. The Internet includes local area networks (LANs), wide area networks (WANs), wireless networks, or long haul public networks that, for example, allow signal packets to be communicated between LANs.

According to some embodiments, the present disclosure may also be utilized within or accessible to an electronic social networking site. A social network refers generally to an electronic network of individuals, such as acquaintances, friends, family, colleagues, or co-workers, which are coupled via a communications network or via a variety of sub-networks. Potentially, additional relationships may subsequently be formed as a result of social interaction via the communications network or sub-networks. In some embodiments, multi-modal communications may occur between members of the social network. Individuals within one or more social networks may interact or communication with other members of a social network via a variety of devices. Multi-modal communication technologies refers to a set of technologies that permit interoperable communication across multiple devices or platforms, such as cell phones, smart phones, tablet computing devices, phablets, personal computers, televisions, set-top boxes, SMS/MMS, email, instant messenger clients, forums, social networking sites, or the like.

In some embodiments, the disclosed networks 110 and/or 105 may comprise a content distribution network(s). A "content delivery network" or "content distribution network" (CDN) generally refers to a distributed content delivery system that comprises a collection of computers or computing devices linked by a network or networks. A CDN may employ software, systems, protocols or techniques to facilitate various services, such as storage, caching, communication of content, or streaming media or applications. A CDN may also enable an entity to operate or manage another's site infrastructure, in whole or in part.

The content server 106 may include a device that includes a configuration to provide content via a network to another device. A content server 106 may, for example, host a site or service, such as streaming media site/service (e.g., YouTube®), an email platform or social networking site, or a personal user site (such as a blog, vlog, online dating site, and the like). A content server 106 may also host a variety of other sites, including, but not limited to business sites, educational sites, dictionary sites, encyclopedia sites, wikis, financial sites, government sites, and the like. Devices that may operate as content server 106 include personal computers desktop computers, multiprocessor systems, microprocessor-based or programmable consumer electronics, network PCs, servers, and the like.

Content server 106 can further provide a variety of services that include, but are not limited to, streaming and/or downloading media services, search services, email services, photo services, web services, social networking services, news services, third-party services, audio services, video services, instant messaging (IM) services, SMS services, MMS services, FTP services, voice over IP (VOIP) services, or the like. Such services, for example a video application and/or video platform, can be provided via the application server 108, whereby a user is able to utilize such service upon the user being authenticated, verified or identified by the service. Examples of content may include images, text, audio, video, or the like, which may be processed in the form of physical signals, such as electrical signals, for example, or may be stored in memory, as physical states, for example.

In accordance with one or more embodiments, content server 106 (or other server) can be configured to provide the systems and methods disclosed herein.

An ad server comprises a server that stores online advertisements for presentation to users. "Ad serving" refers to methods used to place online advertisements on websites, in applications, or other places where users are more likely to see them, such as during an online session or during computing platform use, for example. Various monetization techniques or models may be used in connection with sponsored advertising, including advertising associated with user. Such sponsored advertising includes monetization techniques including sponsored search advertising, non-sponsored search advertising, guaranteed and non-guaranteed delivery advertising, ad networks/exchanges, ad targeting, ad serving and ad analytics. Such systems can incorporate near instantaneous auctions of ad placement opportunities during web page creation, (in some cases in less than 500 milliseconds) with higher quality ad placement opportunities resulting in higher revenues per ad. That is advertisers will pay higher advertising rates when they believe their ads are being placed in or along with highly relevant content that is being presented to users. Reductions in the time needed to quantify a high quality ad placement offers ad platforms competitive advantages. Thus higher speeds and more relevant context detection improve these technological fields.

For example, a process of buying or selling online advertisements may involve a number of different entities, including advertisers, publishers, agencies, networks, or developers. To simplify this process, organization systems called "ad exchanges" may associate advertisers or publishers, such as via a platform to facilitate buying or selling of online advertisement inventory from multiple ad networks. "Ad networks" refers to aggregation of ad space supply from publishers, such as for provision en masse to advertisers. For web portals like Yahoo!®, advertisements may be displayed on web pages or in apps resulting from a user-defined search based at least in part upon one or more search terms. Advertising may be beneficial to users, advertisers or web portals if displayed advertisements are relevant to interests of one or more users. Thus, a variety of techniques have been developed to infer user interest, user intent or to subsequently target relevant advertising to users. One approach to presenting targeted advertisements includes employing demographic characteristics (e.g., age, income, sex, occupation, etc.) for predicting user behavior, such as by group. Advertisements may be presented to users in a targeted audience based at least in part upon predicted user behavior(s).

Another approach includes profile-type ad targeting. In this approach, user profiles specific to a user may be generated to model user behavior, for example, by tracking a user's path through a web site or network of sites, and compiling a profile based at least in part on pages or advertisements ultimately delivered. A correlation may be identified, such as for user purchases, for example. An identified correlation may be used to target potential purchasers by targeting content or advertisements to particular users. During presentation of advertisements, a presentation system may collect descriptive content about types of advertisements presented to users. A broad range of descriptive content may be gathered, including content specific to an advertising presentation system. Advertising analytics gathered may be transmitted to locations remote to an advertising presentation system for storage or for further evaluation. Where advertising analytics transmittal is not immediately available, gathered advertising analytics may be stored by an advertising presentation system until transmittal of those advertising analytics becomes available.

Servers 106, 108 and 120 may be capable of sending or receiving signals, such as via a wired or wireless network, or may be capable of processing or storing signals, such as in memory as physical memory states. Devices capable of operating as a server may include, as examples, dedicated rack-mounted servers, desktop computers, laptop computers, set top boxes, integrated devices combining various features, such as two or more features of the foregoing devices, or the like.

In some embodiments, users are able to access services provided by servers 106, 108 and/or 120. This may include in a non-limiting example, authentication servers, search servers, email servers, social networking services servers, SMS servers, IM servers, MMS servers, exchange servers, photo-sharing services servers, and travel services servers, via the network 105 using their various devices 101-104. In some embodiments, applications, such as a streaming video application (e.g., YouTube®, Netflix®, Hulu®, iTunes®, Amazon Prime®, HBO Go®, and the like), blog, photo storage/sharing application or social networking application (e.g., Flickr®, Tumblr®, and the like), can be hosted by the application server 108 (or content server 106, search server 120 and the like). Thus, the application server 108 can store various types of applications and application related information including application data and user profile information (e.g., identifying and behavioral information associated with a user). It should also be understood that content server 106 can also store various types of data related to the content and services provided by content server 106 in an associated content database 107, as discussed in more detail below. Embodiments exist where the network 105 is also coupled with/connected to a Trusted Search Server (TSS) which can be utilized to render content in accordance with the embodiments discussed herein. Embodiments exist where the TSS functionality can be embodied within servers 106, 108, 120, or an ad server or ad network.

Moreover, although FIG. 1 illustrates servers 106, 108 and 120 as single computing devices, respectively, the disclosure is not so limited. For example, one or more functions of servers 106, 108 and/or 120 may be distributed across one or more distinct computing devices. Moreover, in one embodiment, servers 106, 108 and/or 120 may be integrated into a single computing device, without departing from the scope of the present disclosure.

Figure 2:
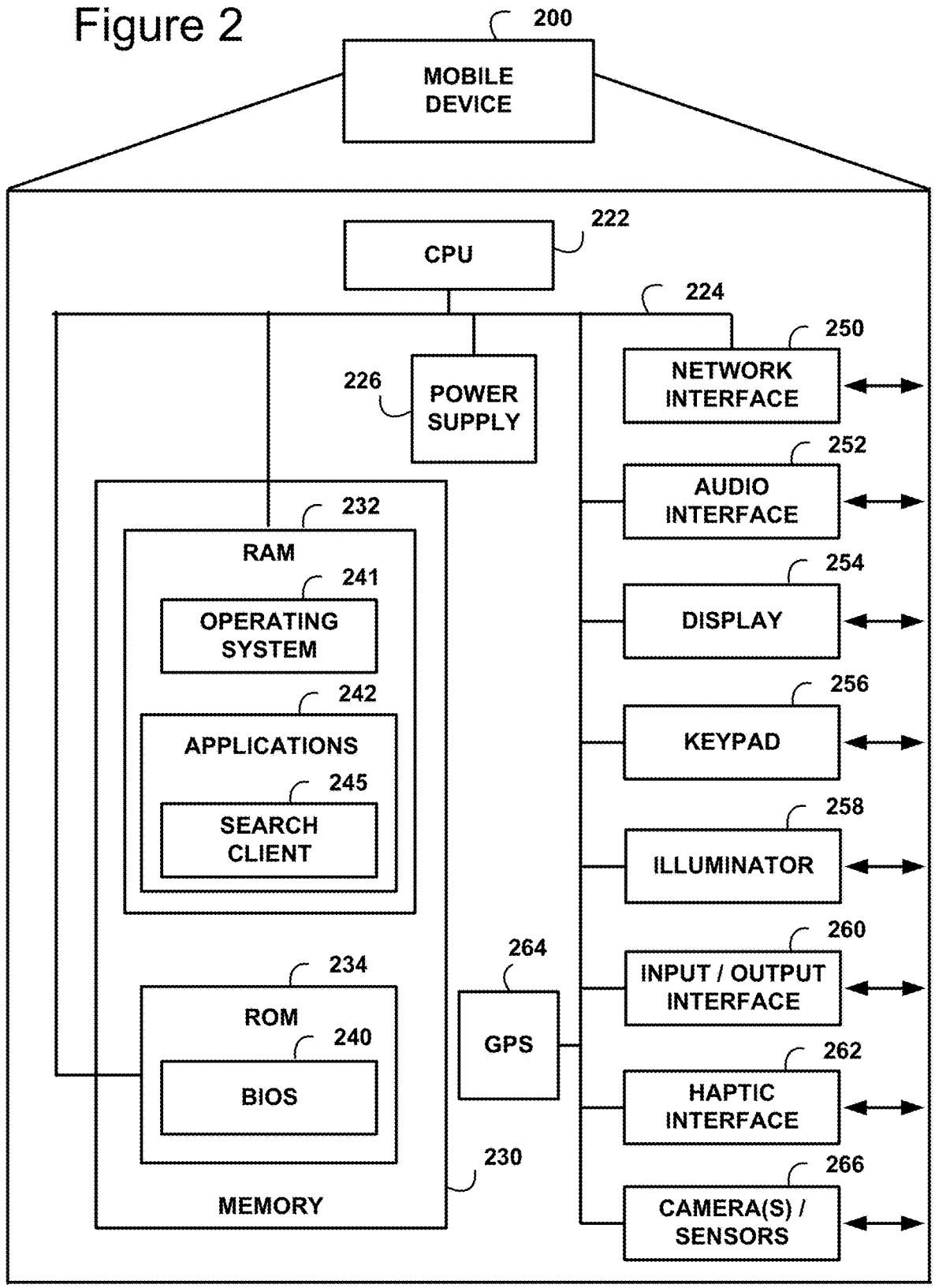
FIG. 2 depicts is a schematic diagram illustrating an example of client device in accordance with some embodiments of the present disclosure.

FIG. 2 is a schematic diagram illustrating a client device showing an example embodiment of a client device that may be used within the present disclosure. Device 200 may include many more or less components than those shown in FIG. 2. However, the components shown are sufficient to disclose an illustrative embodiment for implementing the present disclosure. Device 200 may represent, for example, client device 101 and mobile devices 102-104 discussed above in relation to FIG. 1.

As shown in the figure, device 200 includes a processing unit (CPU) 222 in communication with a mass memory 230 via a bus 224. Device 200 also includes a power supply 226, one or more network interfaces 250, an audio interface 252, a display 254, a keypad 256, an illuminator 258, an input/output interface 260, a haptic interface 262, an optional global positioning systems (GPS) receiver 264 and a camera(s) or other optical, thermal or electromagnetic sensors 266. Device 200 can include one camera/sensor 266, or a plurality of cameras/sensors 266, as understood by those of skill in the art. The positioning of the camera(s)/sensor(s) 266 on device 200 can change per device 200 model, per device 200 capabilities, and the like, or some combination thereof.

Optional GPS transceiver 264 can determine the physical coordinates of device 200 on the surface of the Earth, which typically outputs a location as latitude and longitude values. GPS transceiver 264 can also employ other geo-positioning mechanisms, including, but not limited to, triangulation, assisted GPS (AGPS), E-OTD, CI, SAI, ETA, BSS or the like, or may through other components, provide other information that may be employed to determine a physical location of the device, including for example, a MAC address, Internet Protocol (IP) address, or the like.

Mass memory 230 includes a RAM 232, a ROM 234, and other storage means. Mass memory 230 illustrates another example of computer storage media for storage of information such as computer readable instructions, data structures, program modules or other data. Mass memory 230 stores a basic input/output system ("BIOS") 240 for controlling low-level operation of device 200. The mass memory also stores an operating system 241 for controlling the operation of device 200.

Memory 230 further includes one or more data stores, which can be utilized by device 200 to store, among other things, applications 242 and/or other data. For example, data stores may be employed to store information that describes various capabilities of device 200. The information may then be provided to another device based on any of a variety of events, including being sent as part of a header during a communication, sent upon request, or the like.

Applications 242 may include computer executable instructions which, when executed by device 200, transmit, receive, and/or otherwise process audio, video, images, and enable telecommunication with a server and/or another user of another client device. Other examples of application programs or "apps" in some embodiments include browsers, calendars, contact managers, task managers, transcoders, photo management, database programs, word processing programs, security applications, spreadsheet programs, games, search programs, and so forth. Applications 242 may further include search client 245 that is configured to send, to receive, and/or to otherwise process a search query and/or search result using any known or to be known communication protocols. Although a single search client 245 is illustrated it should be clear that multiple search clients may be employed.

Figure 3:
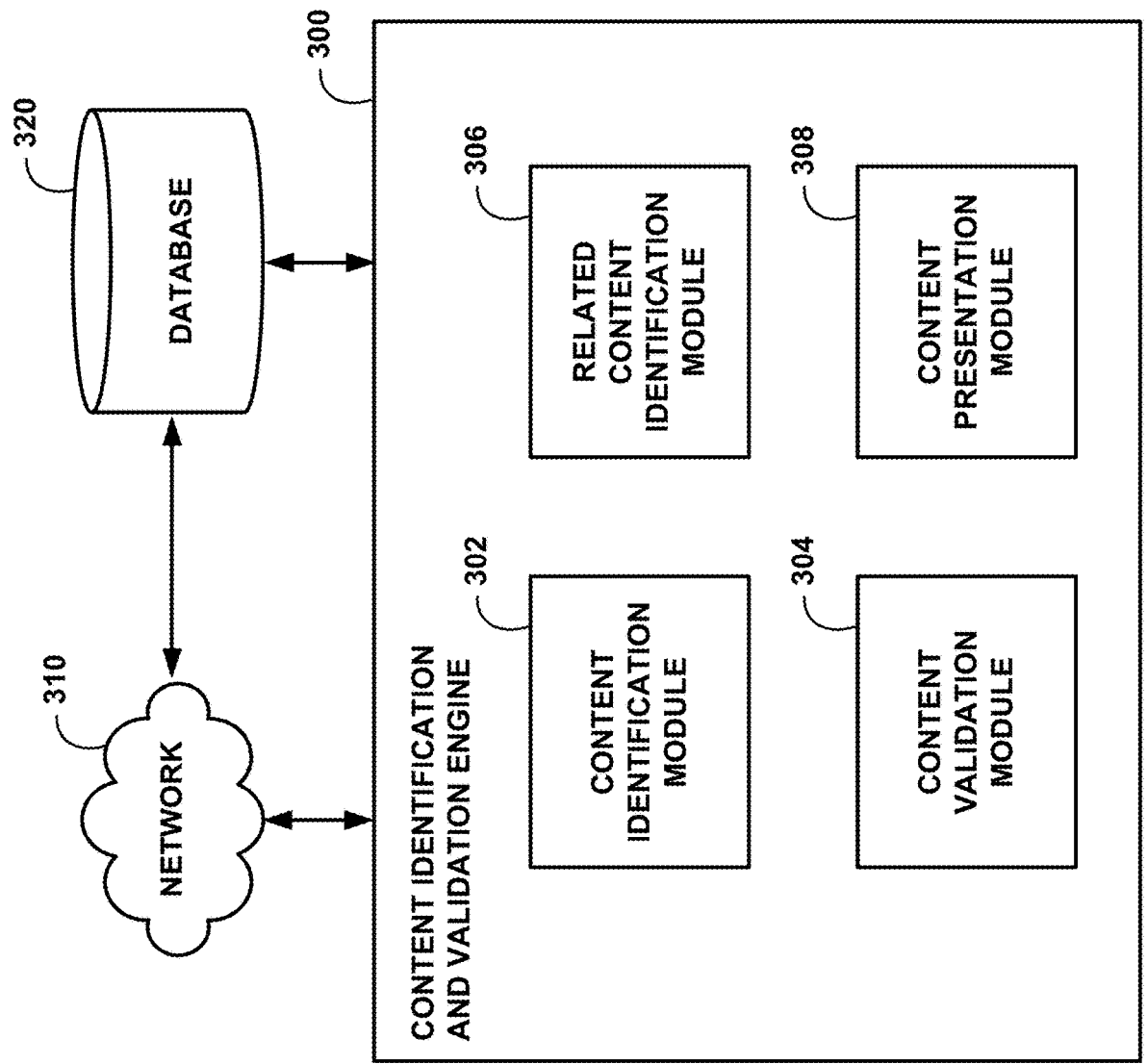
FIG. 3 is a schematic block diagram illustrating components of an exemplary system in accordance with embodiments of the present disclosure.

FIG. 3 is a block diagram illustrating the components for performing the systems and methods discussed herein. FIG. 3 includes a content identification and validation (CIV) engine 300, network 310 and database 320. The CIV engine 300 can be a special purpose machine or processor and could be hosted by an application server, content server, social networking server, web server, search server, content provider, email service provider, ad server, user's computing device, and the like, or any combination thereof.

According to some embodiments, the CIV engine 300 can be embodied as a stand-alone application that executes on a computing device, user computing device, server computing device, etc. In some embodiments, the CIV engine 300 can function as an application installed on the computing device, and in some embodiments, such application can be a web-based application accessed by the computing device over a network.

The database 320 can be any type of database or memory, and can be associated with a server computing device on a network (such as and without limitation a web server, application server, etc.,) or a user's device. Database 320 comprises a dataset of data and metadata associated with local and/or network information related to users, services, applications, content (e.g., video) and the like. Such information can be stored and indexed in the database 320 independently and/or as a linked or associated dataset. It should be understood that the data (and metadata) in the database 320 can be any type of information and type, whether known or to be known, without departing from the scope of the present disclosure.

In some embodiments, the database 320 can include, for purposes of content identification, validation and presentation, a number of content items (e.g., content items from various web sites) including content from social media networking platforms or sites (e.g., Facebook®, Instagram®, Twitter®, Reddit®, etc.), content providers (e.g., online news providers), messaging platforms, and websites (e.g., websites operated by a common provider and other websites or online sources). In accordance with some embodiments, multiple, diverse sources of collateral content items can be used by the disclosed systems and methods to provide a proficient content identification and validation mechanism. By way of a further non-limiting example, the web content can include news, blog posts, newsletter, articles, etc. available from various online websites. The content items can be retrieved using a crawler, search engine, etc. from online websites and/or received from the content providers.

According to some embodiments, database 320 can store other data about users, e.g., user data. According to some embodiments, the stored user data can include, but is not limited to, information associated with a user's profile, user interests, user behavioral information, user attributes, user preferences or settings, user demographic information, user location information, user biographic information, and the like, or some combination thereof. In some embodiments, the user data can also include user device information, including, but not limited to, device identifying information, device capability information, voice/data carrier information, Internet Protocol (IP) address, applications installed or capable of being installed or executed on such device, and/or any, or some combination thereof. It should be understood that the data (and metadata) in the database 320 can be any type of information related to a user, content, a device, an application, a service provider, a content provider, whether known or to be known, without departing from the scope of the present disclosure.

The network 310 can be any type of network such as, but not limited to, a wireless network, a local area network (LAN), wide area network (WAN), the Internet, or a combination thereof. The network 310 facilitates connectivity of the CIV engine 300, and the database 320 of stored resources. Indeed, as illustrated in FIG. 3, the CIV engine 300 and database 320 can be directly connected by any known or to be known method of connecting and/or enabling communication between such devices and resources.

The principal processor, server, or combination of devices that comprises hardware programmed in accordance with the special purpose functions herein is referred to for convenience as CIV engine 300, and includes content identification module 302, content validation module 304, related content identification module 306, and content presentation module 308. It should be understood that the engine(s) and modules discussed herein are non-exhaustive, as additional or fewer engines and/or modules (or sub-modules) may be applicable to the embodiments of the systems and methods discussed. The operations, configurations and functionalities of each module, and their role within embodiments of the present disclosure will be discussed with reference to FIG. 4.

As discussed in more detail below, the information processed by the CIV engine 300 can be supplied to the database 320 in order to ensure that the information housed in the database 320 is up-to-date as the disclosed systems and methods leverage real-time information, as discussed in more detail below.

Figure 4:
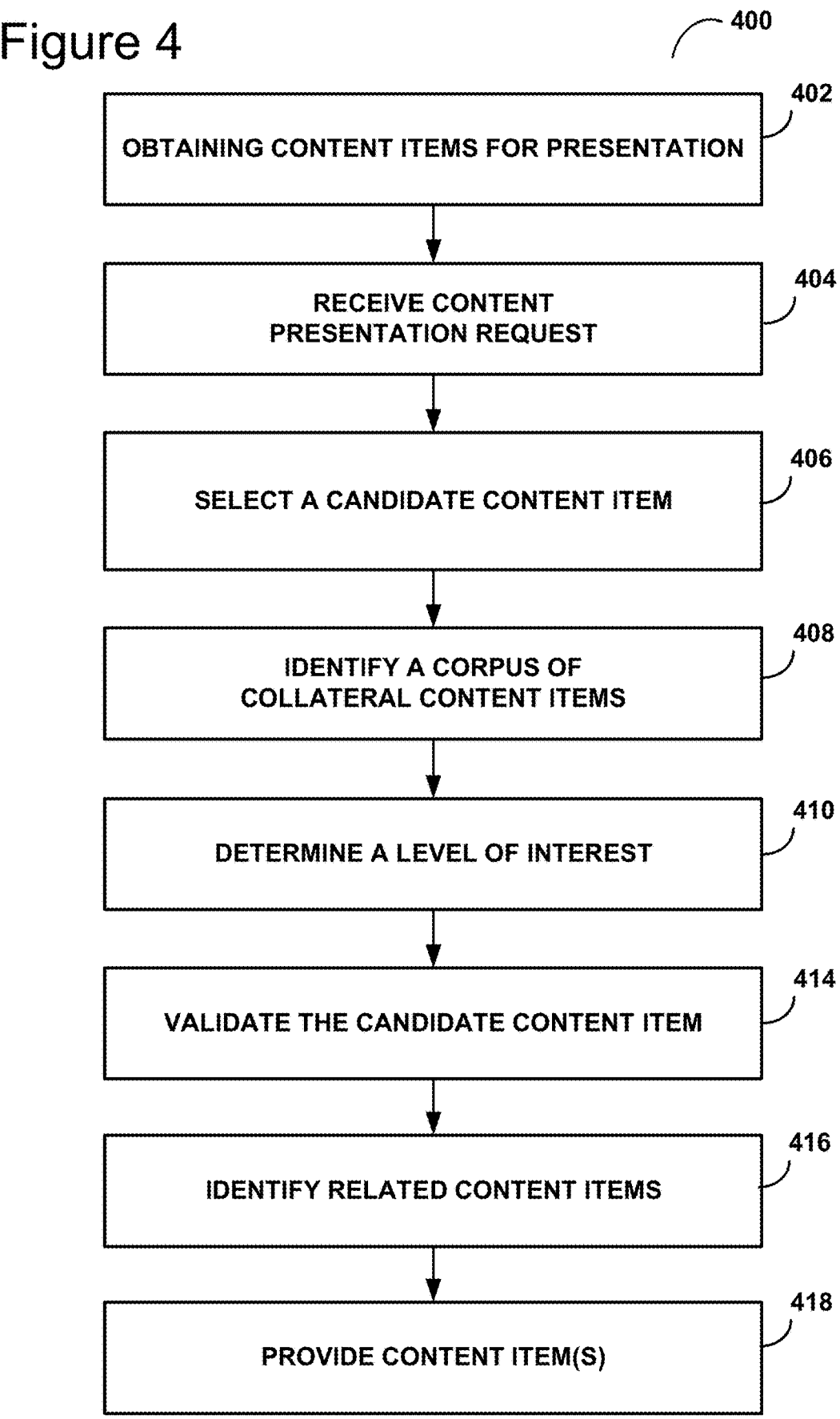
FIG. 4 is a flowchart illustrating steps performed in accordance with some embodiments of the present disclosure.

FIG. 4 provides a process flow overview in accordance with one or more embodiments of the present disclosure. Process 400 of FIG. 4 details steps performed in accordance with exemplary embodiments of the present disclosure for automatically identifying, validating and providing content for presentation at a client computing device. According to some embodiments, as discussed herein with relation to FIG. 4, the process involves obtaining content for presentation, receiving a content presentation request from a client computing device and providing one or more content items (or portions thereof) in a presentation for display at the client computing device. Such process involves selecting a candidate content item, determining a set of keywords for the candidate content item, using the set of keywords to determine a corpus of collateral content items, validating the candidate content item using a sentiment analyzer (an NLP sentiment analyzer) and some or all of the corpus of collateral content items, and providing the candidate content item (with or without a set of other content items identified using the candidate content item) for presentation at the client computing device in response to the content presentation request.

At step 402, which can be performed by content identification module 302 of the CIV engine 300, content items are obtained for presentation. A number of content items can be obtained and considered for presentation to users, e.g., via a web browser, client application, etc. By way of a non-limiting examples, a content item can be web content from a number of online sources. By way of a further non-limiting example, the web content can include news, blog posts, newsletter, articles, etc. available from various online websites. The content items can be retrieved using a crawler, search engine, etc. from online websites and/or received from content providers.

At step 404, which can be performed by CIV engine 300, a content presentation request is received. The content presentation request can be received from a client computing device via a web browser (or another client application) executing at the client computing device.

At step 406, which can be performed by content identification module 302 of the CIV engine 300, a candidate content item can be selected. By way of a non-limiting example, the candidate content item can be selected from the content items obtained at step 402. In accordance with one or more embodiments, a content item can be selected initially based on information associated with the content presentation request. By way of a non-limiting examples, the content presentation request can include one or more search terms that can be used to make an initial content item selection. By way of another non-limiting example, the website or application connected with the presentation of the content can be considered in selecting a candidate content item. For example, content item discussing a financial topic can be selected when the content item is to be presented on a web page of a financial web site provider or user interface of a finance-oriented client application.

At step 406, which can be performed by content identification module 302, a corpus of collateral content items is identified. By way of a non-limiting example, the corpus of collateral content items can be identified using a set of keywords associated with the candidate content item. In accordance with one or more embodiments, the set of keywords can be selected from a number of keywords connected with a candidate content item. By way of some non-limiting examples, a keyword connected with a candidate content item can be extracted from the candidate content item's headline and/or body, from metadata (e.g., hashtag or other metadata) associated with the candidate content item, etc.

A frequency (e.g., a number of occurrences, number of repetitions, etc.) can be determined for each keyword connected with the candidate content item. The frequency associated with each keyword can be used to order the keywords based on frequency and select a number of keywords with greater (or higher) frequency relative to unselected keywords. The number of selected keywords can form a set of keywords that are considered to be the most repeated keywords connected with the candidate content item.

The set of keywords can be used to search for the corpus of collateral content items. In accordance with one or more embodiments, each collateral content item can include some or all of the keywords in the set of keywords. Some non-limiting examples of sources for the collateral content items include social networking platforms (e.g., Facebook®, Instagram®, Twitter®, Reddit®, etc.), content providers (e.g., online news providers), messaging platforms, and websites (e.g., websites operated by a common provider and other websites or online sources). In accordance with some embodiments, multiple, diverse sources of collateral content items can be used by the disclosed systems and methods to provide a proficient content identification and validation mechanism. In accordance with one or more embodiments, the collateral content items from sources such as these can be stored in database 320, such that database 320 can be searched using the set of keywords to identify the corpus of collateral content items (at step 408).

At step 410, which can be performed by content identification module 302, the set of keywords connected with the candidate content item and the corpus of collateral content items can be used to determine if there is a sufficient level of interest in the candidate content item—e.g., if a subject, topic, information, etc. of the candidate content item has a sufficient (e.g., at least a threshold) level of interest with users.

The users, or public, interest in a candidate content item (e.g., a new story or other content item) can be determined using the corpus of collateral content items. In accordance with one or more embodiments, the corpus of collateral content items can be used to determine a frequency for each keyword (in the set of keywords connected with the candidate content item) in the corpus of collateral content items. In a case that the set of keywords comprises multiple keywords, an aggregate keyword frequency (e.g., an average keyword frequency, weighted average keyword frequency, etc.) can be determined. The determined keyword frequency (or frequencies) can be can then be used with a threshold keyword frequency to make a determination whether or not to there is sufficient interest in the contents of the candidate content item. By way of a non-limiting example, a sufficient level of interest in the candidate content item can be determined if the keyword frequency (or frequencies) satisfy (e.g., are at least equal to) the frequency threshold.

At step 414, which can be performed by content validation module 304, the candidate content item can be validated. By way of a non-limiting example, the candidate content item can be validated, or fact checked, using some or all of the collateral content items from the corpus of collateral content items and a sentiment analyzer. In accordance with one or more embodiments, the sentiment analyzer can be a natural language processing (NLP) sentiment analyzer. In accordance with one or more embodiments, some or all of the collateral content items from the corpus of collateral content items retrieved using the set of keywords connected with the selected candidate content item can be used with the NLP sentiment analyzer to fact check the candidate content item.

In accordance with one or more embodiments, the NLP sentiment analyzer can be used to identify a sentiment of the candidate content item and a sentiment of each collateral content item of a number of the collateral content items (from the corpus of collateral content items) used to fact check the selected candidate content item. The sentiment analyzer can be used to examine a content item (e.g., a candidate content item or a collateral content item) for an expression of an opinion, appraisal, emotion, attitude, etc. towards a topic, person or entity. An expression can be classified as positive, negative, or neutral in sentiment. A sentiment can also include a tone, such as a sad, happy, etc. tone.

By way of a non-limiting example, the collateral content items retrieved from one or more social networking platforms using the set of keywords connected with the selected candidate content item can be used with natural language processing (NLP) to fact check the selected candidate content item. By way of a further non-limiting example, collateral content items retrieved from one or more messaging platforms and/or websites can be used along with the collateral content items retrieved from one or more social networking platforms in fact checking the selected candidate content item.

In accordance with one or more embodiments, a measure of agreement in sentiment can be used to validate or fact check the candidate content item. The measure of agreement can be an aggregate of the sentiment scores (e.g., from the sentiment analyzer) associated with the collateral content items (from the corpus used in fact checking the selected candidate content item). The disclosed systems and methods can then validate the candidate content item by making a determination whether or not there is a consensus belief in the information contained in the selected candidate content item using a sentiment agreement threshold (or consensus belief threshold) and the measure of agreement in sentiment generated for the candidate content item. In accordance with one or more embodiments, the determination can be a condition of providing the candidate content item in a presentation to a user. If the measure of agreement in sentiment satisfies the sentiment agreement threshold (e.g., the measure of agreement in sentiment is at least equal to the sentiment agreement threshold), a determination is made that there is an acceptable consensus belief in the information conveyed in the candidate content item. The sentiment agreement threshold (or consensus belief threshold) can be determined from a user preference.

In accordance with one or more embodiments, the measure of agreement in sentiment can be determined using a score associated with each collateral content items (from the corpus used in fact checking the selected candidate content item). A collateral content item's score can be determined using a probability that the collateral content item has the sentiment of the selected candidate content item. The probability can be determined by the sentiment analyzer examining contents of the collateral content item. By way of a non-limiting example, the sentiment analyzer can generate a probability for a number of sentiments (e.g., positive sentiment, negative sentiment, neutral).

In accordance with one or more embodiments, the probability used in determining a collateral content item's score is the probability associated with the sentiment determined for candidate content item using the sentiment analyzer. The measure of agreement in sentiment determined for the candidate content item can be determined by aggregating the score determined for each of the collateral content items (from the corpus used in fact checking the selected candidate content item).

In accordance with one or more embodiments, the score determined for a collateral content item can be a weighted score. By way of a non-limiting example, the weighted score can be determined using a weighting corresponding to a number of keywords in the set of keywords associated with the collateral content item. In accordance with one or more embodiments, the measure of agreement can be an average of the weighted score determined for each collateral content item of the number of collateral content items.

In accordance with one or more embodiments, the aggregate score can be the measure of agreement used with the sentiment agreement threshold (or consensus belief threshold) to make determination whether or not there is a consensus belief in the information contained in the candidate content item. In accordance with one or more embodiments, the determination can be a condition of providing the candidate content item in a presentation to a user. If the measure of agreement in sentiment satisfies the sentiment agreement threshold (e.g., the measure of agreement in sentiment is at least equal to the sentiment agreement threshold), a determination is made that there is an acceptable consensus belief in the information conveyed in the candidate content item.

At step 416, which can be performed by related content identification module 306, related content items can be identified. By way of a non-limiting example, the related content items can be content items other than the candidate content item identified using portions (e.g., paragraphs, sections, subsections, etc.) of the candidate content item (determined to have an acceptable consensus belief). In accordance with one or more embodiments, step 416 can be optional. The related content items can be a set of content items, other than the identified candidate content, each with a sentiment determined to match the selected candidate content item's sentiment. In this manner, each content item being considered for inclusion in the set of content items can be fact checked using portions of the selected candidate content item that has itself been fact checked. By way of a non-limiting example, the set of content items can be selected from the corpus of collateral content items retrieved using the set of keywords connected with the selected candidate content item, such as and without limitation collateral content items retrieved from online sources using the set of keywords connected with the selected candidate content item.

By way of a non-limiting example, one or more other content items can be selected for inclusion in the set of content items using a portion of the selected candidate content item. In accordance with one or more embodiments, for each portion of the selected candidate content item being used to identify the set of content items with matching sentiments, a sentiment can be determined using the sentiment analyzer (e.g., an NLP sentiment analyzer) and collateral content items from the corpus (e.g., collateral content items used in fact checking the selected candidate content item). A sentiment can also be determined for each content item being considered for inclusion in the set of content items. The one or more content items selected for inclusion in the set of content items can be the content item(s) having a sentiment that matches the sentiment of a portion of the candidate content item.

In accordance with one or more embodiments, a measure of agreement in sentiment can be determined for each of the content items in the set of content items. As with the candidate content item, the measure of agreement for a content item in the set of content items can be an aggregate of the sentiment scores (e.g., from the sentiment analyzer) associated with the collateral content items (from the corpus used in fact checking the selected candidate content item). In accordance with one or more embodiments, the content item can be validated by making a determination whether or not there is a consensus belief in the information contained in the content item using the sentiment agreement threshold (or consensus belief threshold) and the measure of agreement in sentiment generated for the content item. In accordance with one or more embodiments, the determination can be a condition of providing the content item in a presentation to a user. If the measure of agreement in sentiment satisfies the sentiment agreement threshold (e.g., the measure of agreement in sentiment is at least equal to the sentiment agreement threshold), a determination is made that there is an acceptable consensus belief in the information conveyed in the content item. The sentiment agreement threshold (or consensus belief threshold) can be determined from a user preference.

At step 418, which is performed by content presentation module 308, the content item(s) (e.g., the candidate content item alone or in combination with one or more content items from the set of content items identified at step 416. In accordance with one or more embodiments, the presentation can be a timeline presentation including the candidate content items and the set of content items. In accordance with one or more embodiments, each content item in the timeline can have corresponding temporal information (e.g., a time and date of the posting of the content item on the web), which can be used in ordering the content items in the timeline presentation.

FIG. 5 provides an exemplary example of a timeline presentation in accordance with one or more embodiments of the present disclosure. In the example shown in FIG. 5, presentation 500 includes a number of entries, each of which corresponds to a content item (e.g., the candidate content item or one of the content items in the set of content items). Each entry can include temporal information 502 associated with the content item (e.g., the date and time that the content item was published, posted online, etc.), an indicator 504 indicating whether or not the content item has been read, a brief summary 506 of the content item (e.g., some portion extracted from the content item, such as one or more words, sentences, paragraphs, etc.) and a consensus belief indicator 508 representing the measure of agreement determined for the content item.

In accordance with one or more embodiments, indicator 504 can be one color indicating that the corresponding content item has been read and another color indicating that the corresponding content item is unread.

In accordance with one or more embodiments, indicator 508 can be a gauge (or meter) comprising a consensus belief range (e.g., disbelieve, mostly disbelieve, debatable, mostly believe, believe) and a needle, arrow, etc. positioned within the range and indicating the measure of agreement in sentiment for a respective content item being presented in the timeline.

FIG. 6 provides a diagram of an exemplary example of a non-limiting embodiment in accordance with some embodiments of the present disclosure. Examples 602 and 604 provide examples of a meter including indicator 608 (e.g., a needle, arrow, histogram, etc.) representing the consensus belief, or measure of agreement in sentiment, for a corresponding content item (e.g., the candidate content item or one from the set of content items). In the example, component 606 can be color-coded in accordance with the measure of agreement. By way of a non-limiting example, a red color can correspond to the lowest consensus belief (e.g., disbelief) and a green color can correspond to the highest consensus belief. With reference to the meter shown in example 604, green can be used for component 606 when the position of indicator 608 corresponds to section 610, chartreuse (or another color between yellow and green) for section 612, yellow for section 614, orange for section 616 and red for section 618.

Referring again to FIG. 5, in accordance with one or more embodiments, the presentation can include an indicator of an aggregate consensus belief in the story presented by the combination of the content items presented in the timeline. By way of a non-limiting example, an aggregate consensus belief can be an average consensus belief determined using the measure of agreement in sentiment determined for each of the content items included in the timeline. In one or more embodiments, a weighting can be used in determining the aggregate measure of agreement in sentiment. By way of a non-limiting example, the measure of agreement in sentiment determined for the identified candidate content item can be given a greater weight than the measure of agreement in sentiment determined for other content items in determining the aggregate consensus belief.

In accordance with one or more embodiments, the entries are initially sorted based on the temporal information 502. Embodiments of the present disclosure can include an ability to sort the entries based on temporal information 502, read/unread indicator 504, summary 506 or measure of agreement in sentiment represented by indicator 508 (e.g., a meter such as that illustrated by examples 602 and 604).

As shown in FIG. 7, internal architecture 700 of a computing device(s), computing system, computing platform, user devices, set-top box, smart TV and the like includes one or more processing units, processors, or processing cores, (also referred to herein as CPUs) 712, which interface with at least one computer bus 702. Also interfacing with computer bus 702 are computer-readable medium, or media, 706, network interface 714, memory 704, e.g., random access memory (RAM), run-time transient memory, read only memory (ROM), media disk drive interface 708 as an interface for a drive that can read and/or write to media, display interface 710 as interface for a monitor or other display device, keyboard interface 716 as interface for a keyboard, pointing device interface 718 as an interface for a mouse or other pointing device. CD/DVD drove interface 720, and miscellaneous other interfaces 722 not shown individually, such as parallel and serial port interfaces and a universal serial bus (USB) interface.

Memory 704 interfaces with computer bus 702 so as to provide information stored in memory 704 to CPU 712 during execution of software programs such as an operating system, application programs, device drivers, and software modules that comprise program code, and/or computer executable process steps, incorporating functionality described herein, e.g., one or more of process flows described herein. CPU 712 first loads computer executable process steps from storage, e.g., memory 704, computer readable storage medium/media 706, removable media drive, and/or other storage device. CPU 712 can then execute the stored process steps in order to execute the loaded computer-executable process steps. Stored data, e.g., data stored by a storage device, can be accessed by CPU 712 during the execution of computer-executable process steps.

Persistent storage, e.g., medium/media 706, can be used to store an operating system and one or more application programs. Persistent storage can further include program modules and data files used to implement one or more embodiments of the present disclosure, e.g., listing selection module(s), targeting information collection module(s), and listing notification module(s), the functionality and use of which in the implementation of the present disclosure are discussed in detail herein.

Network link 728 typically provides information communication using transmission media through one or more networks to other devices that use or process the information. For example, network link 728 may provide a connection through local network 724 to a host computer 726 or to equipment operated by a Network or Internet Service Provider (ISP) 730. ISP equipment in turn provides data communication services through the public, worldwide packet-switching communication network of networks now commonly referred to as the Internet 732.

A computer called a server host 734 connected to the Internet 732 hosts a process that provides a service in response to information received over the Internet 732. For example, server host 734 hosts a process that provides information representing video data for presentation at display 710. It is contemplated that the components of system 700 can be deployed in various configurations within other computer systems, e.g., host and server.

At least some embodiments of the present disclosure are related to the use of computer system 700 for implementing some or all of the techniques described herein. According to one embodiment, those techniques are performed by computer system 700 in response to processing unit 712 executing one or more sequences of one or more processor instructions contained in memory 704. Such instructions, also called computer instructions, software and program code, may be read into memory 704 from another computer-readable medium 706 such as storage device or network link. Execution of the sequences of instructions contained in memory 704 causes processing unit 712 to perform one or more of the method steps described herein. In alternative embodiments, hardware, such as ASIC, may be used in place of or in combination with software. Thus, embodiments of the present disclosure are not limited to any specific combination of hardware and software, unless otherwise explicitly stated herein.

The signals transmitted over network link and other networks through communications interface, carry information to and from computer system 700. Computer system 700 can send and receive information, including program code, through the networks, among others, through network link and communications interface. In an example using the Internet, a server host transmits program code for a particular application, requested by a message sent from computer, through Internet, ISP equipment, local network and communications interface. The received code may be executed by processor 702 as it is received, or may be stored in memory 704 or in storage device or other non-volatile storage for later execution, or both.

For the purposes of this disclosure a module is a software, hardware, or firmware (or combinations thereof) system, process or functionality, or component thereof, that performs or facilitates the processes, features, and/or functions described herein (with or without human interaction or augmentation). A module can include sub-modules. Software components of a module may be stored on a computer readable medium for execution by a processor. Modules may be integral to one or more servers, or be loaded and executed by one or more servers. One or more modules may be grouped into an engine or an application.

For the purposes of this disclosure the term "user", "subscriber" "consumer" or "customer" should be understood to refer to a user of an application or applications as described herein and/or a consumer of data supplied by a data provider. By way of example, and not limitation, the term "user" or "subscriber" can refer to a person who receives data provided by the data or service provider over the Internet in a browser session, or can refer to an automated software application which receives the data and stores or processes the data.

Those skilled in the art will recognize that the methods and systems of the present disclosure may be implemented in many manners and as such are not to be limited by the foregoing exemplary embodiments and examples. In other words, functional elements being performed by single or multiple components, in various combinations of hardware and software or firmware, and individual functions, may be distributed among software applications at either the client level or server level or both. In this regard, any number of the features of the different embodiments described herein may be combined into single or multiple embodiments, and alternate embodiments having fewer than, or more than, all of the features described herein are possible.

Functionality may also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, as well as those variations and modifications that may be made to the hardware or software or firmware components described herein as would be understood by those skilled in the art now and hereafter.

Furthermore, the embodiments of methods presented and described as flowcharts in this disclosure are provided by way of example in order to provide a more complete understanding of the technology. The disclosed methods are not limited to the operations and logical flow presented herein. Alternative embodiments are contemplated in which the order of the various operations is altered and in which sub-operations described as being part of a larger operation are performed independently.

While various embodiments have been described for purposes of this disclosure, such embodiments should not be deemed to limit the teaching of this disclosure to those embodiments. Various changes and modifications may be made to the elements and operations described above to obtain a result that remains within the scope of the systems and processes described in this disclosure.

The invention claimed is:

1. A method comprising:
receiving, at a computing device, a content presentation request from a client computing device;
selecting, via the computing device, a candidate content item in connection with the content presentation request;
identifying, via the computing device, a corpus of collateral content items using a set of keywords associated with the candidate content item;
determining, via the computing device and using a sentiment analyzer, a sentiment of the selected candidate content item;
determining, via the computing device and using the sentiment analyzer and the determined sentiment of the selected candidate content item, a probability corresponding to the determined sentiment of the selected candidate content item for each collateral content item from the corpus of collateral content items, for a respective collateral content item, the probability indicating a likelihood that the respective collateral content item shares the determined sentiment of the selected candidate content item;
determining, via the computing device, a measure of agreement in sentiment indicating a degree to which the determined sentiment of the selected candidate content item is shared by the corpus of collateral content items, the measure of agreement being determined using the probability determined for each collateral content item from the corpus of collateral content items; and
providing, via the computing device, at least a portion of the candidate content item to the client computing device for display in response to the content presentation request, the display comprising a consensus belief indicator representing the determined measure of agreement in sentiment.

2. The method of claim 1, further comprising:
prior to and as a condition of providing the candidate content item, determining, via the computing device, that the measure of agreement satisfies a sentiment agreement threshold.

3. The method of claim 2, the sentiment agreement threshold being determined using user preferences.

4. The method of claim 1, identifying the corpus of collateral content items further comprising:
determining the set of keywords associated with the selected candidate content item, the set of keywords comprising one or more keywords extracted from the selected candidate content item; and
identifying the corpus of collateral content items using the set of keywords, a selected collateral content item including some or all of the set of keywords.

5. The method of claim 4, selecting the candidate content item further comprising:
determining, via the computing device, keyword frequencies for the set of keywords, a keyword frequency corresponding to a keyword in the set of keywords and indicating a frequency of occurrence of the keyword in the corpus of collateral content;
determining, via the computing device, a level of interest in the selected candidate content item using the determined keyword frequencies; and determining, via the computing device, the candidate content item based on a determination that the level of interest in the selected candidate content item satisfies a threshold level of interest.

6. The method of claim 4, determining a measure of agreement further comprising:
  determining, via the computing device, a score for each collateral content item of the corpus of collateral content items, the determining comprising, for a collateral content item, using the probability of the collateral content item having the sentiment determined for the selected candidate content item to determine the score of the collateral content item; and
  determining, via the computing device, the measure of agreement by aggregating the score determined for each of the collateral content items of the corpus of collateral content items.

7. The method of claim 6, the score determined for a collateral content item being a weighted score, the weighted score being determined using a weighting corresponding to a number of keywords in the set of keywords associated with the collateral content item.

8. The method of claim 7, the measure of agreement is an average of the weighted score determined for each collateral content item of the corpus of collateral content items.

9. The method of claim 1, further comprising:
  identifying, via the computing device, a set of content items, other than the selected candidate content, each with a sentiment determined to match the sentiment of the selected candidate content item; and
  providing, via the computing device, the set of content items with the selected candidate content item to the client computing device for display in response to the content presentation request.

10. The method of claim 9, identifying the set of content items further comprising:
  selecting, via the computing device, the set of content items from the corpus of collateral content items using one or more portions of the selected candidate content item, selection of a collateral content item from the corpus of collateral content items comprising:
    determining, via the computing device, a sentiment for a portion of the selected candidate content item; and
    identifying a collateral content from the corpus of collateral content items with a sentiment matching the sentiment determined for the portion of the selected candidate content item.

11. The method of claim 10, further comprising:
  determining a measure of agreement for each collateral content item included in the set of content items, the display comprising a consensus belief indicator representing the measure of agreement for each collateral content item included in the set of content items.

12. The method of claim 11, the selected candidate content item and the set of content items are provided to the client computing device in a timeline presentation, the timeline presentation comprising an entry for the selected candidate content item and an entry for each collateral content item in the set of content items, each entry comprising a consensus belief indicator representing the measure of agreement for a respective content item corresponding to the entry.

13. The method of claim 1, the collateral content items included in the corpus of collateral content items comprising content items from a number of social networking sites.

14. The method of claim 13, the collateral content items included in the corpus of collateral content items comprising content items from a number of electronic messaging systems.

15. The method of claim 14, the collateral content items included in the corpus of collateral content items comprising content items from a number of online news sites.

16. A non-transitory computer-readable storage medium tangibly encoded with computer-executable instructions that when executed by a processor associated with a computing device perform a method comprising:
  receiving a content presentation request from a client computing device;
  selecting a candidate content item in connection with the content presentation request;
  identifying a corpus of collateral content items using a set of keywords associated with the candidate content item;
  determining, using a sentiment analyzer, a sentiment of the selected candidate content item;
  determining, using the sentiment analyzer and the determined sentiment of the selected candidate content item, a probability corresponding to the determined sentiment of the selected candidate content item for each collateral content item from the corpus of collateral content items, for a respective collateral content item, the probability indicating a likelihood that the respective collateral content item shares the determined sentiment of the selected content item;
  determining a measure of agreement in sentiment indicating a degree to which the determined sentiment of the selected candidate content item is shared by the corpus of collateral content items, the measure of agreement being determined using the probability determined for each collateral content item from the corpus of collateral content items; and
  providing at least a portion of the candidate content item to the client computing device for display in response to the content presentation request, the display comprising a consensus belief indicator representing the determined measure of agreement in sentiment.

17. The non-transitory computer-readable storage medium of claim 16, further comprising:
  identifying a set of content items from the corpus of collateral content items, each with a sentiment determined to match the sentiment of the selected candidate content item; and
  providing the set of content items with the selected candidate content item to the client computing device for display in response to the content presentation request.

18. The non-transitory computer-readable storage medium of claim 17, further comprising:
  determining a measure of agreement for each collateral content item included in the set of content items, the display comprising a consensus belief indicator representing the measure of agreement for each collateral content item included in the set of content items.

19. The non-transitory computer-readable storage medium of claim 18, the selected candidate content item and the set of content items are provided to the client computing device in a timeline presentation, the timeline presentation comprising an entry for the selected candidate content item and an entry for each collateral content item in the set of content items, each entry comprising a consensus belief indicator representing the measure of agreement for a respective content item corresponding to the entry.

20. A computing device comprising:

a processor;

a non-transitory storage medium for tangibly storing thereon program logic for execution by the processor, the program logic comprising:

receiving logic executed by the processor for receiving a content presentation request from a client computing device;

selecting logic executed by the processor for selecting a candidate content item in connection with the content presentation request;

identifying logic executed by the processor for identifying a corpus of collateral content items using a set of keywords associated with the candidate content item;

determining logic executed by the processor for determining, using a sentiment analyzer, a sentiment for the selected candidate content item;

determining logic executed by the processor for determining, using the sentiment analyzer and the sentiment determined for the selected candidate content item, a probability corresponding to the determined sentiment of the selected candidate content item for each collateral content items from the corpus of collateral content items, for a respective collateral content item, the probability indicating a likelihood that the respective collateral content item shares the determined sentiment of the selected candidate content item;

determining logic executed by the processor for determining a measure of agreement in sentiment indicating a degree to which the determined sentiment of the selected candidate content item is shared by the corpus of collateral content items, the measure of agreement being determined using the probability determined for each collateral content item from the corpus of collateral content items; and providing logic executed by the processor for providing at least a portion of the candidate content item to the client computing device for display in response to the content presentation request, the display comprising a consensus belief indicator representing the determined measure of agreement in sentiment.

* * * * *